Sept. 21, 1965   F. W. CHRISTENSEN   3,206,986
APPARATUS FOR SENSING SELECTED MOVEMENTS OF A BODY
Filed Jan. 4, 1963   3 Sheets-Sheet 1
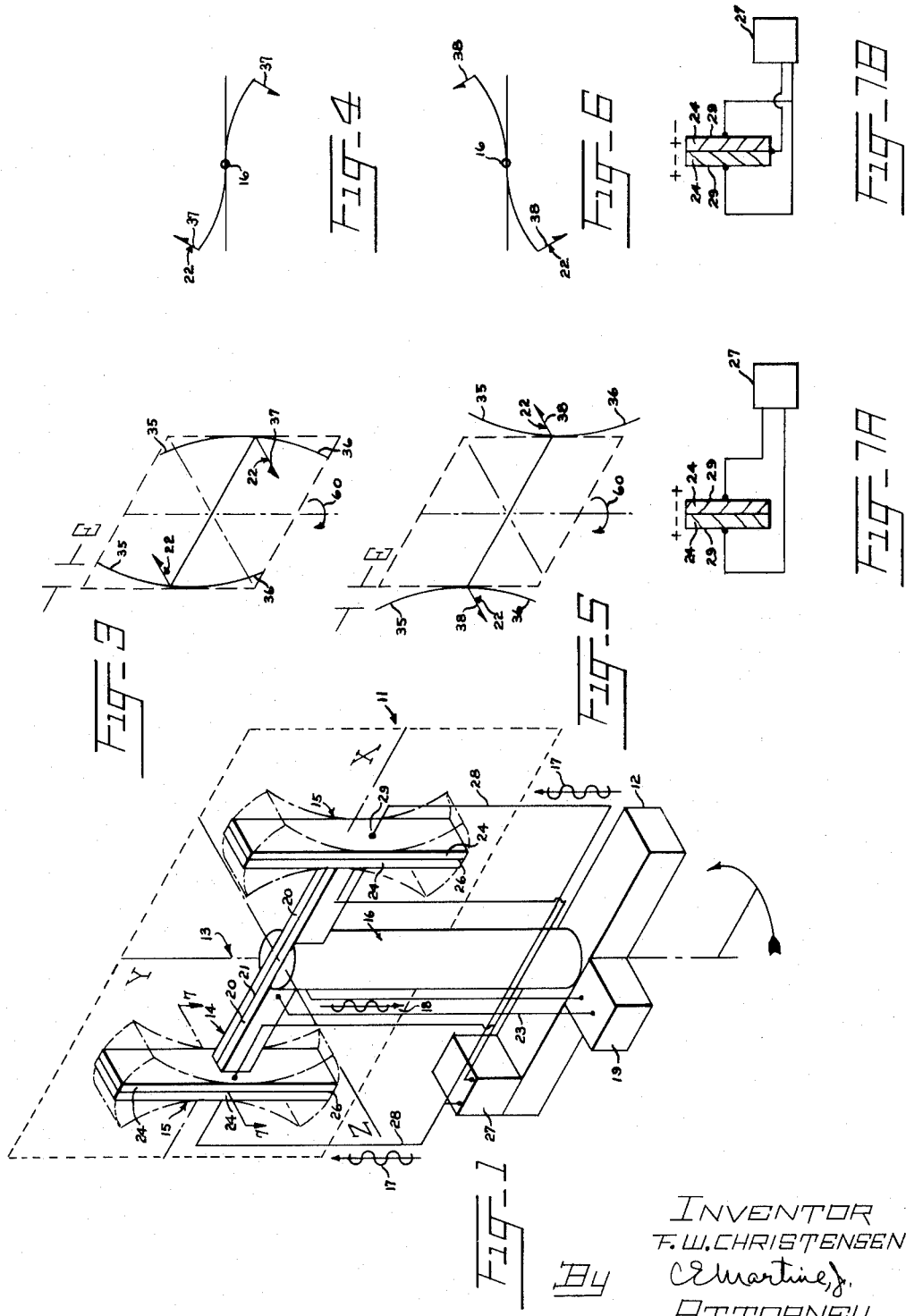
INVENTOR
F. W. CHRISTENSEN
BY
ATTORNEY

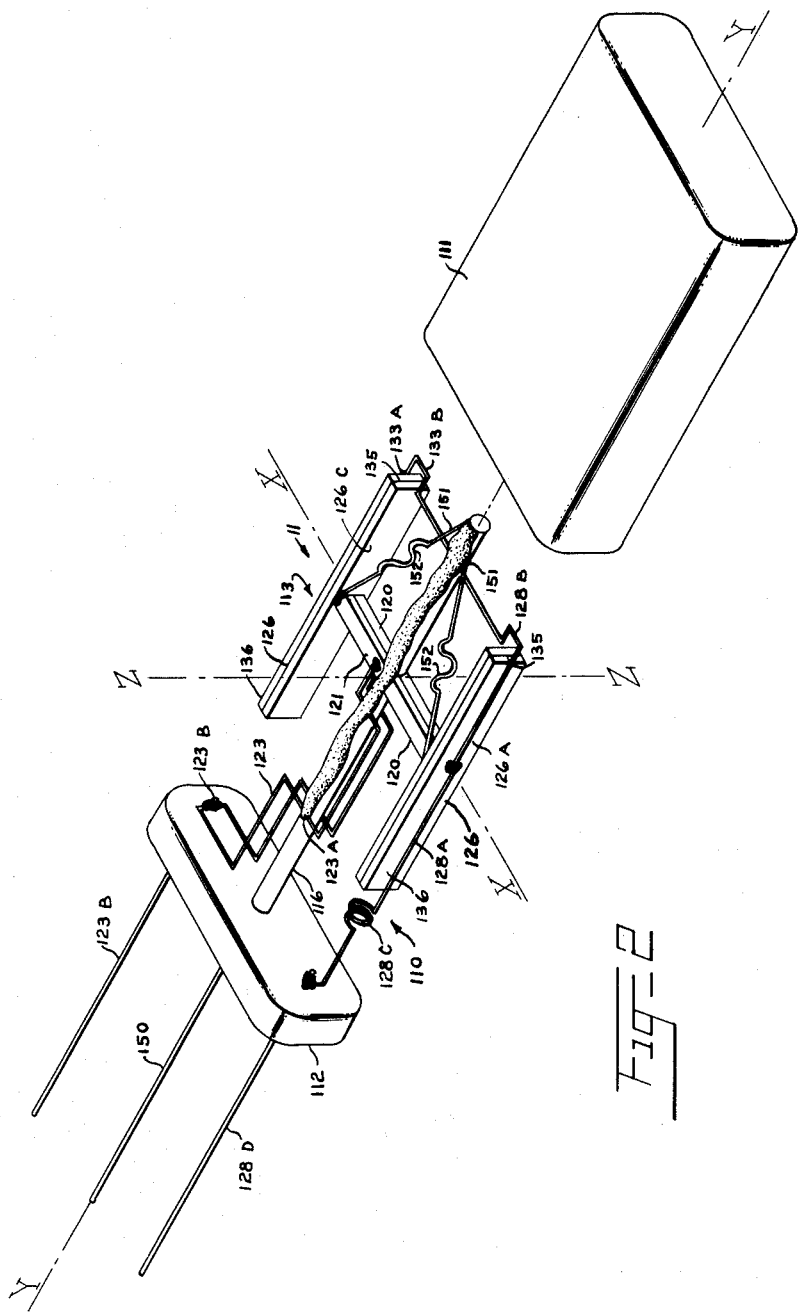

Sept. 21, 1965   F. W. CHRISTENSEN   3,206,986
APPARATUS FOR SENSING SELECTED MOVEMENTS OF A BODY
Filed Jan. 4, 1963   3 Sheets-Sheet 3
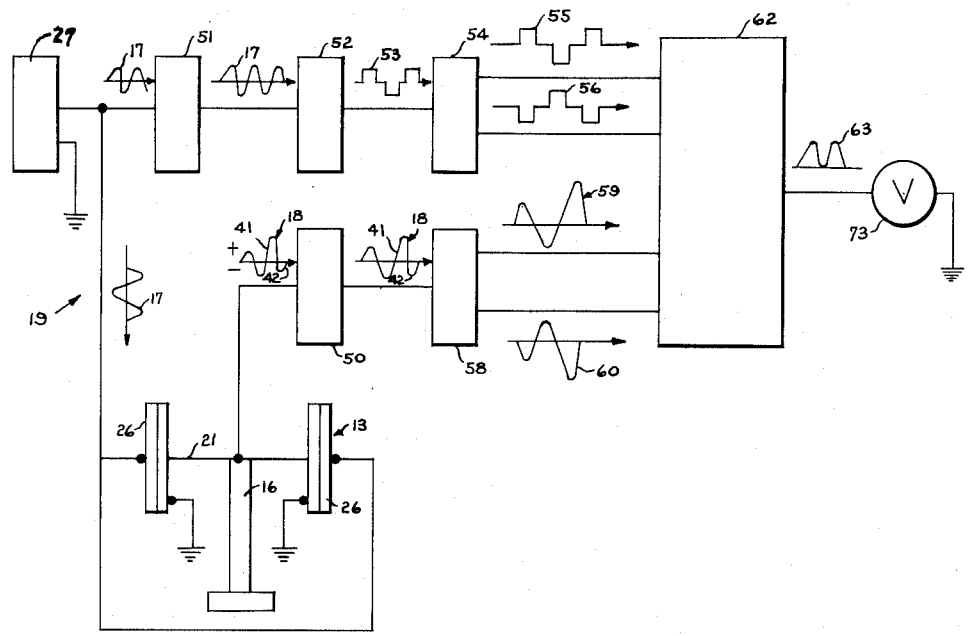
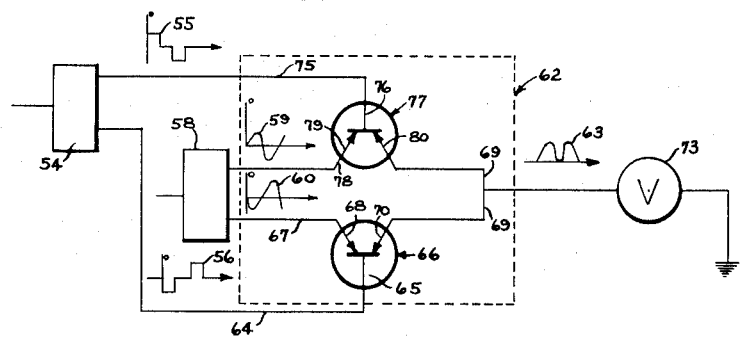
INVENTOR
F. W. CHRISTENSEN
By C. Martine, J.
ATTORNEY United States Patent Office 3,206,986
Patented Sept. 21, 1965

3,206,986
APPARATUS FOR SENSING SELECTED
MOVEMENTS OF A BODY
Frank W. Christensen, Pennington, N.J., assignor to
Western Electric Company, Incorporated, New York,
N.Y., a corporation of New York
Filed Jan. 4, 1963, Ser. No. 249,370
8 Claims. (Cl. 73—505)

This invention relates to apparatus for sensing selected movements of a body and, more particularly, to apparatus for indicating the rate of movement of a body around a predetermined axis.

In the guidance field, facilities utilizing mechanical gyroscopes have been successfully employed for guiding bodies, such as airplanes and the like. Characteristics such as size and weight have rendered such mechanical gyroscopes of limited application in guiding space vehicles and other bodies in which minimum weight and size are prime considerations.

Attempts to provide facilities less subject to such size and weight limitations led to the development of facilities for changing the radius of gyration of inertia members. The inertia members are effective as space references which may be utilized in guidance facilities. Such inertia members, however, have necessarily been three-dimensional in configuration and, hence, still subject to significant size limitations.

Prior two-dimensional gyroscopic facilities developed to satisfy the size considerations have been found to be inherently dynamically unstable and, as a result, are sources of undesirable vibration and stress. These undesirable characteristics may cause generation of erroneous signals which render such prior two-dimensional gyroscopic facilities of limited application.

Research conducted in an endeavor to provide gyroscopic facilities requiring a minimum of size and weight while possessing superior operational characteristics, has resulted in the development of a dynamically-balanced, two-dimensional gyroscopic system. The two-dimensional configuration of the system may be smaller than a postage stamp, rendering the system compatible for use with microminiature control devices. In addition, a commercial embodiment of the system is compatible with known quartz crystal packaging technology and manufacturing methods. The system is also characterized by a low inherent mass which results in high resistance to shock.

The system is further characterized by a high sensitivity to selected movement of a body and, in conjunction with its minute size and compatibility with microminiature control devices, is adapted for use in facilities for guiding bodies, such as space vehicles, guided missiles, and the like.

It is an object of this invention to provide new and improved apparatus for sensing selected movements of a body.

Another object of this invention resides in the provision of a dynamically-balanced, two-dimensional gyroscopic system for indicating the rate of movement of a body around a predetermined axis.

Still another object of this invention is to provide for use in a guidance facility a gyroscopic unit for sensing the rotation of a body around a predetermined axis wherein the unit imparts no net force to the body when the body is not rotating around the axis.

A further object of the present invention resides in the provision of a generally H-shaped gyroscopic unit including driven side facilities which render a crossbar instrumentally sensitive to rotation of a body around a predetermined axis.

With these and other objects in view, the present invention contemplates provision of a system for sensing the rotation of a body around a selected axis wherein the system imparts only torsional forces to the body. A substantially two-dimensional unit provided in the system may include an elongated sensor facility extending perpendicular to the axis for generating a signal in response to a condition of stress. One of a pair of parallel bimorphic instrumentalities is mounted at the mid-point thereof to each end of the sensor facility in a plane defined by the axis and the sensor facility to complete the unit. A column extending parallel to the axis provides a mount for the unit by supporting the sensor facility at its mid-point. The column rotates the sensor facility about the axis upon rotation of the body. The bimorphic instrumentalities are driven in phase opposition in the defined plane and, upon rotation of the body around the axis, effect a cyclic condition of stress in the sensor facility. A device responsive to the signal generated by the stressed sensor facility is provided for indicating the rate and direction of rotation of the body.

A complete understanding of the present invention may be had by referring to the following detailed description and the accompanying drawings illustrating a preferred embodiment thereof, in which:

FIG. 1 is a schematic perspective view of apparatus constructed according to the principles of the present invention showing an H-shaped unit for sensing selected movements of a body;

FIG. 2 is a perspective view of an embodiment of the apparatus shown in FIG. 1 suitable for commercial application illustrating a container for housing the H-shaped unit;

FIG. 3 is a schematic view illustrating the ends of opposed side members of the unit driven by an input signal to an inward position for decreasing the radius of gyration of the side members;

FIG. 4 is a plan view schematically showing accelerative forces resulting from the decreasing radius of gyration of the side members wherein such forces flex a crossbar of the unit in a first direction and render the crossbar effective to generate a pulse representative of the movement of the body;

FIG. 5 is a schematic view similar to FIG. 3 illustrating the ends of the side members of the unit driven by the input signal to an outward position for increasing the radius of gyration of the side members;

FIG. 6 is a plan view similar to FIG. 4 showing decelerative forces resulting from the increase in radius of gyration of the side members wherein such forces flex the crossbar in the opposite direction and render the crossbar effective to generate a pulse representative of the movement of the body;

FIGS. 7A and 7B are cross-sectional views taken on line 7—7 of FIG. 1 showing the polarization and electrical connection of two embodiments of the side members to a source of oscillating signals;

FIG. 8 is a diagram of an electrical circuit responsive to a signal formed by the pulses generated by the crossbar for indicating the rate of movement of the body; and FIG. 9 is a circuit diagram of a switch utilized in the circuit shown in FIG. 8.

Referring in general to FIG. 1 of the drawings, there is shown a gyroscopic system 11 embodying the principles of the present invention for sensing rotation of a body 12 around a selected axis, such as the Y axis. The system 11 may be utilized to correct or compensate for the sensed rotation so that the system is held against rotation around the Y axis in the manner of a space reference device such as an attitude gyroscope. The system 11 is termed "gyroscopic" in this sense.

The vertical axis of the system 11 is parallel to the Y axis of the body 12. For simplicity of description, the vertical axis of the system 11 and the Y axis of the body are shown coincident, it being understood that the vertical axis and the Y axis may also be spaced.

The system 11 is provided with a substantially two-dimensional unit 13 which includes a crossbar 14 for supporting side members 15 in parallel relationship. A column 16 mounts the unit 13 on the body 12 by supporting the node or mid-point of the crossbar 14.

In response to a driving or alternating input signal 17, the side members 15 are driven or vibrated at their resonant frequency in phase opposition, i.e., in opposite directions, in a plane defined by the X–Y axes. When driven in this manner, the radius of gyration of each side member 15 varies cyclically in a direction opposite to the direction of the other driven side member. Such vibration of the side members 15 in phase opposition renders the unit 13 dynamically balanced and hence stable with respect to the Y axis in that no net force along the X–Z plane is applied to the column 16.

Upon rotation of the body 12 around the Y axis, the column 16 rotates the unit 13. It may be understood that upon such rotation of the unit 13, the cyclic variation of the radius of gyration of the side members 15 is effective to cyclically impress a condition of stress on the crossbar 14. In response to such cyclic condition of stress, the crossbar 14 is adapted to generate a signal 18 (see also FIG. 8) having a frequency equal to the driving frequency of the side members 15 and proportitonal to the rate of rotation of the body 12 around the Y axis.

A circuit 19 is responsive to the signal 18 generated by the crossbar 15 for indicating the rate and direction of rotation of the body 12 or controlling apparatus (not shown) for correcting or compensating for the angular movement of the body 12 around the Y axis. The circuit 19 may also be adapted to indicate the rate of change in angular velocity of the body around the Y axis by the provision of facilities for differentiating the signal 18.

Referring in detail to FIG. 1, it may be appreciated that the unit 13 may be constructed in a two-dimensional, generally H-shaped configuration including the crossbar 14 and the side members 15 which define a plane, such as the X–Y plane. The crossbar 14 may be a single member constructed from a single piezoelectric crystal. Preferably, the crossbar 14 includes two strips 20 which are assembled by a suitable adhesive to form a bimorph or crossbar bimorph 21. The strips 20 may be fabricated from piezoelectric crystals of the piezo-ceramic type, such as barium titanate, and are preferably one-half of an acoustical wavelength in the direction of the X axis. The strips 20 are polarized and assembled so that the inner, adjoining faces thereof are negative and the outer faces thereof positive.

The crossbar bimorph 21 is bisected by the Y axis and is supported at its node or nodal point, which is the mid-point thereof, by the column 16. The column 16 supports the crossbar bimorph 21 in the position shown in FIG. 1 so that the crossbar bimorph 21 is sensitive only to stresses applied thereto by a force couple 22 (FIGS. 3 and 5) exerted around the Y axis. When flexed in response to the force couple 22, the crossbar bimorph 21 is effective to generate the signal 18. Conductors or lead wires 23 are electrically and mechanically secured to the mid-point of the crossbar bimorph 21 to conduct the signal 18 to the circuit 19.

The side members 15, the other elements of the generally H-shaped unit 13, may be constructed from layers 24 that are cemented together to form bimorphic elements 26. The layers 24 may be fabricated from piezoelectric crystals of the piezo-ceramic type, such as barium titanate. Each of the bimorphic elements 26 is preferably one-half of an acoustical wavelength in the direction of the Y axis. The long axis of each of the bimorphic elements 26 is positioned in the X–Y plane parallel to the Y axis. In this position, the node or nodal point, which is also the mid-point, of each element 26 is rigidly secured by a suitable adhesive to an end of the crossbar bimorph 21.

In such secured position, the bimorphic elements 26 are adapted to be driven and vibrate in the X–Y plane in response to the driving signal 17 from a voltage source such as an oscillator 27. The frequency of the driving signal 17 is such as to drive the bimorphic elements 26 at their resonant frequency.

As staed above, the crossbar bimorph 21 and the bimorphic elements 26 are preferably one-half of an acoustical wavelength. Such wavelength is preferred so that both the bimorph 21 and the bimorphic elements 26 have the same resonant frequency. With the bimorphic elements 26 driven by the signal 17 at their resonant frequency, the unit 13 has a characteristic of maximum sensitivity to rotation of the body 12 around the Y axis. More particularly, to effect such characteristic in the unit 13, the dimensional configurations of the bimorphic elements 26 and the bimorph 21 are so related that the total mass supported by the bimorph 21, in conjunction with the length of the bimorph 21, renders the bimorph 21 resonant at the resonant frequency of the bimorphic elements 26.

The driving signal 17 is conducted from the oscillator 27 to the bimorphic elements 26 by conductors 28 which are electrically and mechanically secured to the outside faces 29 of the bimorphic elements 26 at the nodal points thereof so that the conductors do not effect the resonance of the elements 26. As shown in FIG. 7A, the layers 24 may be polarized so that in their assembled orientation as bimorphic elements 26, the outer faces 29 are positive and the inner, adjacent faces are negative, i.e., plus-minus—minus-plus. For increased sensitivity of the signal 18 to rotation of the body 12, however, the polarization may be plus-minus—plus-minus, with the two outside faces 29 connected together as shown in FIG. 7B. The driving signal 17 is applied between the outside faces 29 and the inner faces so that the same driving voltage is applied across one layer 24 as is applied across both layers 24 in the FIG. 7A example. The sensitivity is increased in the FIG. 7B example by increasing the power of the driving signal 17.

Attention is now directed to FIGS. 3 and 5 for a schematic representation of the details of the vibration of the bimorphic elements 26. In FIG. 3, oppositely disposed pairs of ends 35 and 36 of the elements 26 are shown advanced toward each other through a maximum excursion or amplitude of vibration of two E during a first half cycle of vibration. It may be understood that the radius of gyration of each element 26 decreases during this first half cycle.

During the next successive half-cycle of vibration, the opposite ends 35 and 36 of the bimorphic elements 26, in responding to the driving signal 17, advance away from each other through a relative distance of four times the value of the maximum excursion E to the outward position shown in FIG. 5. During this successive half cycle, the radius of gyration of the elements 26 with respect to the Y axis increases.

Because the bimorphic elements 26 are constructed to have the same mass, and further because the respective opposite ends 35 and 36 vibrate in phase opposition, the cyclical change in the radius of gyration of the bimorphic elements 26 does not result in the application of a net force on the column 16. The bimorphic elements 26 do, however, impart cyclic compression and tension forces on the bimorph 21. Since the bimorph 21 is polarized against sensitivity to such forces, the bimorph does not generate a signal 20 as a result of such compression and tension forces.

However, upon rotation of the body 12 around the Y axis, the cyclic change of the radius of gyration of the bimorphic elements 26 renders the bimorphic elements 26 effective to alternately apply the force couple 22 to the bimorph 21. More particularly, as shown in FIGS. 3 and 4, when the body 12 rotates around the Y axis in the direction of the arrow 60, for example, during the first half cycle of vibration of the elements 26, the force couple 22 is in the form of accelerative forces 37 which are applied in the direction of rotation by the bimorphic elements 26 on the bimorph 21 as the radius of gyration of each bimorphic element 26 decreases. As shown in FIG. 4, the force couple 22 flexes the bimorph 21 in the clockwise direction. Because the bimorph 21 is polarized for sensitivity to flexure around the Y axis, such flexure thereof renders the bimorph 21 effective to generate a pulse 41 (FIG. 8) of a first polarity.

During the next successive half cycle of vibration of the bimorphic elements 26, and as the body 12 continues to rotate clockwise around the axis Y, the increase in the radius of gyration of the elements 26 renders the bimorphic elements 26 effective to apply the force couple 22 in the opposite direction and in the form of decelerative forces 38 on the bimorph 21 (FIG. 5). In response to the decelerative forces 38, the bimorph 21 is flexed in the opposite direction (FIG. 6). Because of the polarization thereof, such flexure renders the bimorph 21 effective to produce a pulse 42 (FIG. 8) that is opposite in polarity to the pulse 41.

With the length of the bimorph 21 and the bimorphic elements 26 equal to the preferred one-half of an acoustical wavelength, and the source 27 driving the bimorphic elements 26 at their resonant frequency, the frequency of change of the radius of gyration of the bimorphic elements 26 equals such resonant frequency. Accordingly, it may be understood that the frequency of the cyclic force couple 22, and hence the frequency of the flexure imparted by the bimorphic elements 26 on the bimorph 21, equals such resonant frequency of the elements 26. Because the resonant frequencies of the elements 26 and the bimorph 21 are the same, it is apparent that the amplitude of flexure of the bimorph 21 will be a maximum for the force applied by the force couple. Thus the sensitivity of the unit 13 to rotation of the body is greatest when the bimorphic elements 26 and the bimorph 21 are one-half of an acoustical wavelength.

It may be understood that the signal 18 is formed by the successive pulses 41 and 42 which result from application of the cyclic force couple 22 on the bimorph 21. The phase and amplitude of the rate signal 18 are proportional to the rate of rotation of the body 12.

As shown in FIG. 8, the driving signal 17 and the rate signal 18 are applied to amplifiers 51 and 50, respectively. The amplified signal 17 is applied to a clipper-shaper 52 for producing a shaped pulse 53. The shaped pulse 53 is applied to a phase splitter 54 which generates phase opposed signals 55 and 56.

The amplified signal 18 is applied to a phase splitter 58 which generates phase opposed signals 59 and 60. The signals 55, 56, 59 and 60 are impressed on a full wave synchronous switch 62 which generates an output signal 63 having an amplitude proportional to the rate of rotation of the body 12 around the Y axis and a polarity indicative of the direction of such rotation.

Attention is directed to FIG. 9 where an embodiment of the full wave synchronous switch 62 is shown including a conductor 64 for impressing the signal 56 on a base 65 of a first bilateral switching PNP transistor 66. A conductor 67 is provided for impressing the signal 60 on an emitter 68 of the transistor 66. A conductor 69 connects a collector 70 of the transistor 66 to a meter 73 such as a voltmeter responsive to the polarity and amplitude of the signal 63.

Similarly, a conductor 75 is provided for impressing the signal 55 on a base 76 of a second bilateral switching PNP transistor 77. A conductor 78 is provided for applying the signal 59 to an emitter 79 of the transistor 77, whereas a collector 80 thereof is connected to the meter 73 by the conductor 69.

During a half cycle of the driving signal 17, for example, in the operation of the switch 62, the conductor 64 impresses a negative portion, for example, of the signal 56 on the base 65, rendering the transistor 66 conductive. Upon conduction, the transistor 66 passes a portion of the signal 60, a positive portion, for example, to the meter 73 which indicates the rate and direction of rotation of the body 12 around the Y axis.

During the next half cycle of operation, the signal 56 goes positive, rendering the transistor 66 nonconductive, whereas the signal 55 goes negative, rendering the transistor 77 conductive. At this time a positive going portion, for example, of the signal 59 impressed on the emitter 79 is passed to the meter 73. The positive portions of the signals 59 and 60 form the output signal 63. In response to the output signal 63, the meter 73 indicates a rate and direction of rotation of the body 12.

When rotation of the body 12 in a first direction is indicated by the meter 73 as a positive meter reading, for example, rotation in a second direction, opposite to the first direction, is indicated as a negative meter reading.

Referring now to FIG. 2, there is shown a magnified or enlarged illustration of an embodiment 110 of the gyroscopic system 11 that is suitable for commercial application. A detailed description of the embodiment 110 is hereafter presented as an illustration of the substantially two-dimensional, miniature configuration of the system 11. It is to be understood, however, that the described embodiment 110 does not reflect the fullest extent of miniaturization thereof that may be rendered possible by more refined manufacturing techniques, because the embodiment 110 was fabricated manually for demonstration purposes. Thus, a unit 113, similar to the unit 13, may be constructed of more minute dimensions so long as all of the driven and sensor components of the unit resonate at the same frequency.

The system 11 may be housed in a container 111, such as an extremely flat, standard can for housing quartz crystals. The container 111 may have a width in the direction of the X axis of approximately eleven-sixteenths of an inch and a length in the direction of the Y axis of approximately one and one-half inches. The container 111 is very thin, such as nine thirty-seconds of an inch in the direction of the axis and, in this respect, may be referred to as substantially two-dimensional. The container 111 fits snugly over a base 112 that is adapted to be firmly secured to the body 12 (FIG. 1) so that movement of the body 12 (FIG. 1) is imparted to the base.

A column 116 is rigidly secured to the base 112 for supporting a bimorph 121 of the unit 113 at its midpoint. The column 116 is fabricated from rod stock having 0.100 inch diameter. The bimorph 121 is constructed similar to the bimorph 21 in that the bimorph 121 includes a pair of strips 120 fabricated from piezoelectric crystals of the piezo-ceramic type, such as barium titanate. The bimorph 121 is preferably one-half of an acoustical wavelength and is polarized so that the inner, adjoining faces of the strips 120 are negative and the outer faces positive. In particular, the bimorph 121 of the embodiment 110 is approximately seven-sixteenths of an inch in length and is fabricated from barium titanate bimorph stock that is 0.020 inch in the direction of the Z axis and three-sixteenths of an inch in the direction of the Y axis.

Conductors 123 are adhesively mounted to and electrically insulated from the column 116 at a point 123A. The conductors 123 terminate at a terminal 123B which may be inserted in a connector (not shown) to electrically connect the bimorph 121 to the circuit 19.

Parallel bimorphic elements 126 adhesively secured to the ends of the bimorph 121 form the remainder of the unit 13 of the embodiment 110. The bimorphic elements 126 are polarized as shown in FIG. 7A. The bimorphic elements are also fabricated in a manner similar to the fabrication of the bimorphic elements 26 and are preferably one-half of an acoustical wavelength. In particular, the bimorphic elements are fabricated from the same barium titanate bimorph stock as that used for the bimorph 121 and are seven-eighths of an inch in the direction of the Y axis.

A conductor 128A is electrically and mechanically connected to the nodes or mid-points of the outer surfaces 126A of the elements 126. Loops 128B provided in the conductor 128A skirt the ends 135 of the elements 126 to provide clearance during excursion of the ends 135. The conductor 128A extends parallel to the elements 126 into a coil form 128C to a terminal 128D. The coil form 128C is provided to preclude the application of undesirable torsional forces to the element 126 and hence the bimorph 121 during rotation of the body 12. The terminal 128D is adapted to extend into a connecter (not shown) which may provide electrical connection with the oscillator 27.

Another function of the column 116, is shown in FIG. 2 to be that of a ground conductor for completing a circuit from the source 27 through a terminal 150, through a pair of lead wires 151, and to the nodes or mid-points of the inner faces 126C of the bimorphic elements 126. Offsets 152 are provided in the wires 151 to permit flexure thereof and thus preclude the application of torsional forces from the column 116 on the elements 126.

Because both of the bimorphic elements 126 are preferably one-half of an acoustical wavelength in the direction of the Y axis, the resonant frequency of the elements 126 is the same. The voltage source 27 drives the bimorphic elements 126 at such resonant frequency for vibrating the pairs of opposed ends 135 and 136 in phase opposition. Because the bimorph 121 is also one-half of an acoustical wavelength, the resonant frequency thereof is equal to the resonant frequency of the bimorphic elements 126, rendering the system 11 of maximum sensitivity to rotation of the body 12 around the Y axis.

In the operation of the embodiment 110, the terminals 123B, 128D and 150 are inserted into a suitable connector (not shown) that is secured to the body 12 so that the base 112 is securely mounted on the body with the axis Y of the unit 113 coincident with the Y axis of the body 12. The oscillator 27 is then energized and produces the driving signal 17 having a frequency of 250 cycles per second for conditioning the unit 113 for sensing rotation of the body 12 around the Y axis. Upon such rotation, the unit 13 operates as described above in the description of FIG. 1 for generating the signal 18 which is rendered indicative of the rate of rotation by the circuit 19.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a device for sensing rotation of a body around an axis,
sensor means positioned perpendicular to said axis for generating a signal in response to a condition of stress therein,
a parallel element mounted at a node thereof to each end of said sensor means in a plane defined by said axis and said sensor means,
mounting means extending along said axis and supporting said sensor means at a node thereof for rotating said sensor means upon rotation of said body,
means for driving said elements in phase opposition in said defined plane to cyclically bias said sensor means in support of and in opposition to said rotation of said sensor means so that said condition of stress is cyclically effected in said sensor means, and
means responsive to said signal generated in response to said cyclic condition of stress for indicating the rate of said rotation.

2. In a device for sensing rotation of a body around an axis,
means positioned perpendicular to said axis and responsive to a condition of stress therein for generating a signal,
first bimorphic means secured at a node thereof to one end of said generating means for vibratory movement in a plane defined by said axis and said generating means,
second bimorphic means secured at a node thereof to the other end of the generating means for vibratory movement in said plane,
support means coextensive with said axis and secured to the mid-point of said generating means for rotating said generating means upon rotation of said body,
means for imparting to said first and second bimorphic means said vibratory movement in phase opposition for alternately aiding and opposing rotation of said generating means to cyclically effect said condition of stress, and
means responsive to said signal for indicating the rate of said rotation around said axis.

3. In a generally H-shaped system for indicating the rate of rotation of a body around a predetermined axis,
means for supplying an oscillating input signal;
a crossbar bimorph positioned perpendicular to said axis and polarized for sensing and generating an output signal in response to forces around said axis;
a column extending from said body parallel to said axis for rotating said crossbar bimorph upon said rotation of said body;
two bimorphic elements, one of said bimorphic elements being mounted at a nodal point thereof to each end of said crossbar bimorph and vibrated by said input signal for imparting to said crossbar bimorph forces around said axis upon rotation of said body; and
means operated by said output signal for indicating said rate of rotation of said body around said axis.

4. In a system for indicating movement of a body around a predetermined axis,
a unit for sensing movement of said body around said axis, said unit including:
an elongated sensor mounted perpendicular to said axis for generating a signal in response to a condition of stress therein, and
first and second bimorphic elements mounted at the mid-points thereof to the opposite ends of said sensor in a plane defined by said sensor and said axis, said first and second bimorphic elements having freedom of movement limited to said plane;
means for driving said bimorphic elements in phase opposition in said plane to condition said bimorphic elements for applying said condition of stress to said sensor;
a column extending from said body along said axis, said column being rotated upon movement of said body around said axis for rendering said conditioned bimorphic elements effective to apply said condition of stress to said sensor; and
means responsive to said signal for indicating the rate of said movement of said body around said axis.

5. In a substantially two-dimensional system for sensing angular rotation of a body around an axis,
a generally H-shaped gyroscopic unit including:
a pair of spaced, parallel bimorphic elements defining a plane parallel to and including said axis, said pair of bimorphic elements being adapted to vibrate in said plane, and
a crossbar bimorph for rigidly maintaining the nodes of the pair of bimorphic elements spaced at a fixed distance, said crossbar bimorph being adapted to produce a signal indicative of a condition of stress therein;
a column extending from said body along said axis for imparting rotation around said axis to said gyroscopic unit upon rotation of said body;

means for vibrating said pair of bimorphic elements in phase opposition in said plane to effect said condition of stress upon said rotation; and means responsive to said signal for indicating the angular velocity of said body.

6. In a system for indicating rotation of a body around a selected axis, a two-dimensional, generally H-shaped unit for sensing said rotation, said unit comprising:

a crossbar bimorph positioned perpendicular to said selected axis, said crossbar bimorph being polarized for sensitivity to flexure around said selected axis and adapted to produce a rate signal upon said flexure, and first and second side member bimorphic elements supported at their nodes parallel to said selected axis by said crossbar bimorph;

a column parallel to said selected axis and connected to the node of said crossbar bimorph for imparting rotation of said body to said unit;

means for vibrating the bimorphic elements to impart said flexure to said crossbar bimorph upon rotation of said body; and means operated by said rate signal for indicating the rate of said rotation of said body.

7. A system for indicating the rate of rotation of a body around a predetermined axis, comprising:

a pair of spaced bimorphic elements positioned parallel to said axis, each of said elements having one-half of an acoustical wavelength and being adapted to resonate at a predetermined frequency;

a bimorph positioned perpendicular to said axis for mounting said bimorphic elements at the nodal points thereof in said parallel position, said bimorph having one-half of an acoustical wavelength so that the resonant frequency thereof equals said predetermined frequency, said bimorph being adapted to generate an output signal upon resonance thereof;

a column extending from said body parallel to said axis for mounting said bimorph at the nodal point thereof, said column being adapted to rotate said bimorph upon rotation of said body;

means for resonating said bimorphic elements to impart resonance to said bimorph upon rotation of said body; and means responsive to said output signal for indicating the rate of rotation of said body.

8. In a device for sensing rotation of a body around an axis, sensor means for generating a signal in response to a condition of stress therein;

a pair of parallel elements, one of said elements being mounted at a node thereof to each end of said sensor means in a plane defined by said axis and said sensor means;

mounting means supporting said sensor means at a node thereof for rotating said sensor means upon rotation of said body;

means for driving said elements to cyclically bias said sensor means in support of and in opposition to said rotation of said sensor means so that said condition of stress is cycyically effected in said sensor means; and means responsive to said signal generated in response to said cyclic condition of stress for indicating the rate of said rotation.

References Cited by the Examiner

UNITED STATES PATENTS

| 2,544,646 | 3/51 | Barnaby | 73—505 |
| 2,627,400 | 2/53 | Lyman | 73—505 |
| 2,683,247 | 7/54 | Wiley | 73—505 |

FOREIGN PATENTS 611,011  10/48  Great Britain.

RICHARD C. QUEISSER, *Primary Examiner.*

JAMES J. GILL, *Examiner.*